United States Patent

Honsberg

[15] 3,660,017
[45] May 2, 1972

[54] ABSORPTION AND HYDROLYSIS OF CARBON OXYSULFIDE

[72] Inventor: Wolfgang Honsberg, Wilmington, Del.

[73] Assignee: E. I. du Pont de Nemours and Company, Wilmington, Del.

[22] Filed: Apr. 28, 1969

[21] Appl. No.: 819,959

[52] U.S. Cl. .....................................23/2 R, 23/150, 23/181
[51] Int. Cl. .........................................................B01d 53/34
[58] Field of Search......................23/2, 3, 2.3, 3.3, 150, 181

[56] References Cited

UNITED STATES PATENTS 3,161,461  12/1964  Deal et al......................................23/2
3,098,705  7/1963   Bally..............................................23/3

FOREIGN PATENTS OR APPLICATIONS 765,761  8/1967  Canada...........................................23/2

Primary Examiner—Earl C. Thomas
Attorney—Raymond E. Blomstedt

[57] ABSTRACT

Carbon oxysulfide is hydrolyzed with water at a temperature of at least 100°C. in the presence of an N-substituted alkanolamine or ether of the formula $$R-NH(CH_2)_n-OR_1$$

where R is a saturated alkyl or cycloalkyl radical of 1 to 20 carbon atoms; $R_1$ is hydrogen or a saturated alkyl radical of 1 to 4 carbon atoms; and $n$ is an integer of 2–4. The process can be carried out in a continuous manner, water being introduced into the system at about the same rate as carbon oxysulfide is decomposed.

8 Claims, No Drawings

ABSORPTION AND HYDROLYSIS OF CARBON OXYSULFIDE

BACKGROUND OF THE INVENTION

Carbon oxysulfide is a byproduct of certain organic reactions, such as the pyrolysis of xanthates (CHUGAEV reaction) or reaction of sodium dithiocarbamates with phosgene. It also is present in some petroleum fractions. Carbon oxysulfide is a toxic, odorless gas which is not readily absorbed by aqueous sodium hydroxide solutions and is fairly resistant to hydrolysis.

It is known to absorb carbon oxysulfide by contacting it with either mono- or diethanolamine, sometimes also in the presence of an alkali. In the prior art processes using an ethanolamine, the ethanolamine is consumed and cannot be recovered. Furthermore, the prior art process also generally suffer from the disadvantage that such absorption is often quite inefficient and must be carried out in several stages. Where an alkali also is present, the alkali is gradually used up in the reaction and converted to a mixture of carbonate and bicarbonate, which cannot be economically recovered from the solution. There is, therefore, a need for a simple and efficient process for the absorption and decomposition of carbon oxysulfide, where water is the only chemical used up in the reaction.

SUMMARY OF THE INVENTION

It has been discovered that carbon oxysulfide is readily hydrolyzed by contacting it at a temperature above about 100° C. with water in the presence of a compound of formula I:

where R is a saturated alkyl or cycloalkyl radical of 1 to 20 carbon atoms; $R_1$ is hydrogen or a saturated alkyl radical of 1 to 4 carbon atoms; and $n$ is an integer of 2–4.

DETAILED DESCRIPTION OF THE INVENTION

The absorption and hydrolysis of carbon oxysulfide by the process of the present invention is most conveniently carried out by a continuous process, although a batch process also can be used. Carbon oxysulfide-containing gas stream is passed through an N-substituted alkanolamine or ether of Formula I above, maintained at a temperature higher than about 100° C. The upper temperature limit is the boiling point of each particular compound I at the reaction pressure. Either atmospheric or superatmospheric pressure can be used, but the main purpose of operating at superatmospheric pressures is to make possible the use of alkanolamines and ethers of Formula I having lower boiling points. It therefore is not worthwhile to operate at pressures exceeding about 200 psig.

To hydrolyze carbon oxysulfide, water is injected into the system either continuously or at regular intervals. The amount of water which is injected is kept on the level required by the stoichiometry of the reaction. It is therefore, necessary to know the concentration of carbon oxysulfide in the inlet gases. The amount of water which is added to the reactor should be synchronized with the feed rate of carbon oxysulfide. The effectiveness of hydrolysis depends at the same time on the particular compound I which is used, the reaction temperature, the feed rate, and the residence time.

It is apparent that the N-substituted alkanolamine or its ether which is necessary in the operation of this process has a dual purpose; it acts as an absorber for carbon oxysulfide and also participates in the hydrolysis reaction. Since it is not used up in this process, it may appear to have only a catalytic effect. The hydrolysis reaction, however, is not truly catalytic, and there is a definite reaction rate. The addition of carbon oxysulfide and of water must be adjusted to the rate of hydrolysis, so that under ideal conditions as much carbon oxysulfide and of water is introduced to the reaction as is used up in the hydrolysis reaction in a given period of time.

Although the exact mechanism of the reaction is not perfectly understood, it seems that in the first stage a thiolcarbamate is formed from compound I and carbon oxysulfide, and that this thiolcarbamate is further decomposed by water, thus regenerating compound I and yielding carbon dioxide and hydrogen sulfide, as shown in the equation, below:

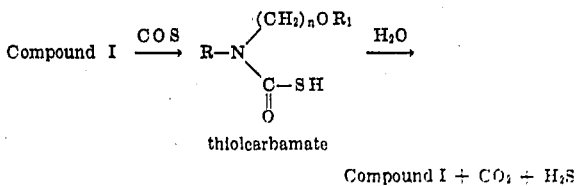

thiolcarbamate

Compound I + CO₂ + H₂S

Primary alkanolamines or their ethers, i.e., compounds similar in structure to compound I but having two hydrogen atoms attached to the nitrogen atom, are not suitable in the process of the present invention. Their main shortcoming is that during the hydrolysis step they undergo unknown side reactions and give products from which the original primary alkanolamine or ether can no longer be regenerated. This of course makes such compounds undesirable. Tertiary alkanolamines and ethers, i.e., compounds of general structure similar to compound I but having no hydrogen atoms attached to the nitrogen atom, also are unsuitable; apparently because such compounds no longer can participate in the reaction with carbonyl sulfide, such as illustrated by the equation, above. Compounds of the general Formula I which are useful in the process of the present invention are considerably better than certain other secondary alkanolamines or their derivatives, such as for example N,N-diethanolamine. It is possible that certain base strength is necessary and that the compounds which are used in the process of the present invention have the proper base strength in addition to having the proper structure. Applicant, however, does not wish to be bound by an theoretical explanation.

There are no strict limitations on the molecular weight of compounds of the general formula I which can be used in the process of the present invention, except that such an amine must be liquid at the required temperature and that it must have a boiling point of at least 100° C. at the reaction pressure. Alkanolamines and ethers of general Formula I which have radical R containing from 1 to 6 carbon atoms are preferred because of their desirable boiling temperature range and good fluidity characteristics at the reaction temperatures. Because of their ready availability, N-substituted ethanolamines and their ethers are particularly preferred ($n = 2$). Representative compounds of Formula I which can be used in this process include N-methylethanolamine, N-ethylethanolamine, N-propylethanolamine, N-hexylethanolamine, N-cyclohexylethanolamine, N-dodecylethandamine, N-hexadecylethanolamine, N-cyclopentylethanolamine, N-methylpropanolamine, N-cyclohexylpropanolamine, N-dodecylpropanolamine, N-propylbutanolamine, N-hexylbutanolamine, N-cyclopentylbutanolamine, N-methyl-N-methoxyethylamine, N-ethyl-N-methoxyethylamine, N-ethyl-N-ethoxyethylamine, N-propyl-N-methoxyethylamine, N-cyclohexyl-N-butoxypropylamine, and N-dodecyl-N-butoxybutylamine.

The efficiency of carbon oxysulfide absorption and hydrolysis can be determined by well-known analytical techniques, such as gas chromatography, mass spectroscopy, or infrared spectroscopy. Gas chromatography is the most suitable analytical technique which can be used both with batch systems and with continuous systems. Since carbon dioxide is one of two decomposition products of carbon oxysulfide, the ratio of unhydrolyzed carbon oxysulfide to carbon dioxide in the off-gas from the reactor can give a very good indication of the reaction effectiveness. The lower the ratio the more effective is the hydrolysis.

The invention is now illustrated by the following Examples 1–5:

EXAMPLES 1–5

Technical grade carbonyl sulfide (>96 percent pure) from a compressed gas cylinder is bubbled into an N-alkylethanolamine contained in a five neck round-bottom flask equipped with a blade-type stirrer, thermometer, reflux condenser, fritted glass gas dispersion tube and soft rubber serum cap. Water is injected with a hypodermic syringe at 10-minute intervals in amounts theoretically required for hydrolysis. The flash contents are maintained at approximately 110° or 150° C. The off-gas, after passing through the water-cooled reflux condenser is measured with a wet-test meter. From time to time off-gas samples are withdrawn with a hypodermic syringe at a point just upstream of the wet-test meter for gas chromatographic analysis. The results are presented in Table I, below:

TABLE I

| Example Number | Amine used | Weight of amine, grams | Temp. °C. | COS feed rate, grams/hr. | Total time, hours | Mole ratio COS:CO$_2$ in offgas |
|---|---|---|---|---|---|---|
| 1 | N-methylethanolamine | 225 | 110 | 76 | 2 | 1:5.2 |
| 2 | do | 225 | 110 | 36 | 2 | 1:10 |
| 3 | do | 225 | 150 | 76 | 2.5 | 1:30–69 |
| 4 | do | 225 | 150 | 138 | 0.4 | 1:66 |
| 5 | N-ethylethanolamine | 267 | 150 | 76 | 1.4 | 1:9–15 |

NOTE: Water injection is 2.8 ml. every 10 minutes for Examples 1, 3, and 5 and proportionally higher or lower for other feed rates.

Control Experiments
(Not within the scope of the invention)

Hydrolysis of carbon oxysulfide is attempted under the same conditions as in Examples 1–5, above, except that amines outside the scope of Formula I are used. The results are summarized in Table II.

TABLE II

| Example Number | Amine used | Wt. of amine, grams | Temp., °C. | COS feed rate, g./hr. | Total time, hours | Mole ratio COS:CO$_2$ in off-gas |
|---|---|---|---|---|---|---|
| 6 | Diethanolamine | 315 | 110 | 76 | 1.3 | 1:0.6–0.9 |
| 7 | do | 315 | 150 | 76 | 1 | 1:2.5–3.4 |
| 8 | Aminoethanol | 183 | 150 | 76 | 2 | 1:0.08–0.2 |
| 9 | Di-n-butylamine | 260 | 130 | 76 | 1 | 1:0.7–1.4 |

NOTE: In these experiments it is necessary to reduce the rate of addition of water as water buildup decreases temperature by about 10° C.

It can readily be seen from the comparison of the results in Table I with those in Table II that an N,N-dialkanolamine, a primary N-alkanolamine, and a secondary aliphatic amine are considerably less effective in the hydrolysis of carbon oxysulfide than N-alkylethanolamines, which are within the scope of Formula I.

I claim
1. A process for removing carbon oxysulfide from a gas stream, said process consisting essentially of:
   a. contacting a carbon oxysulfide-containing gas stream at a temperature of at least 100° C. with a liquid compound of the formula:

$$R - NH - (CH_2)_n - OR_1$$

where R is an alkyl radical containing 1–20 carbon atoms; $R_1$ is selected from the group: hydrogen and alkyl of 1–4 carbon atoms; and $n$ is an integer from 2 to 4 to absorb said carbon oxysulfide by forming a reaction product with said liquid compound;
   b. contacting reaction product resulting from step (a) with water in an amount about equal to that stoichiometrically required to hydrolyze the carbon oxysulfide, while maintaining a temperature of at least 100° C.

2. The process of claim 1, wherein R is a straight chain alkyl radical of 1–6 carbon atoms; $R_1$ is hydrogen; and $n$ is 2.

3. The process of claim 2, where R is methyl.

4. The process of claim 2, where R is ethyl.

5. The process of claim 2, wherein the steps (a) and (b) are carried out in the same reactor.

6. The process of claim 2, wherein the temperature is maintained between 100° C. and 150° C.

7. The process of claim 2, wherein the pressure is maintained at 50–200 psig.

8. The process of claim 2 wherein the gas stream is continuously fed into the liquid compound and the resulting reaction mass is continuously contacted with water.

* * * * *